No. 834,951. PATENTED NOV. 6, 1906.
J. VIALL.
AGRICULTURAL FORK.
APPLICATION FILED JUNE 14, 1906.
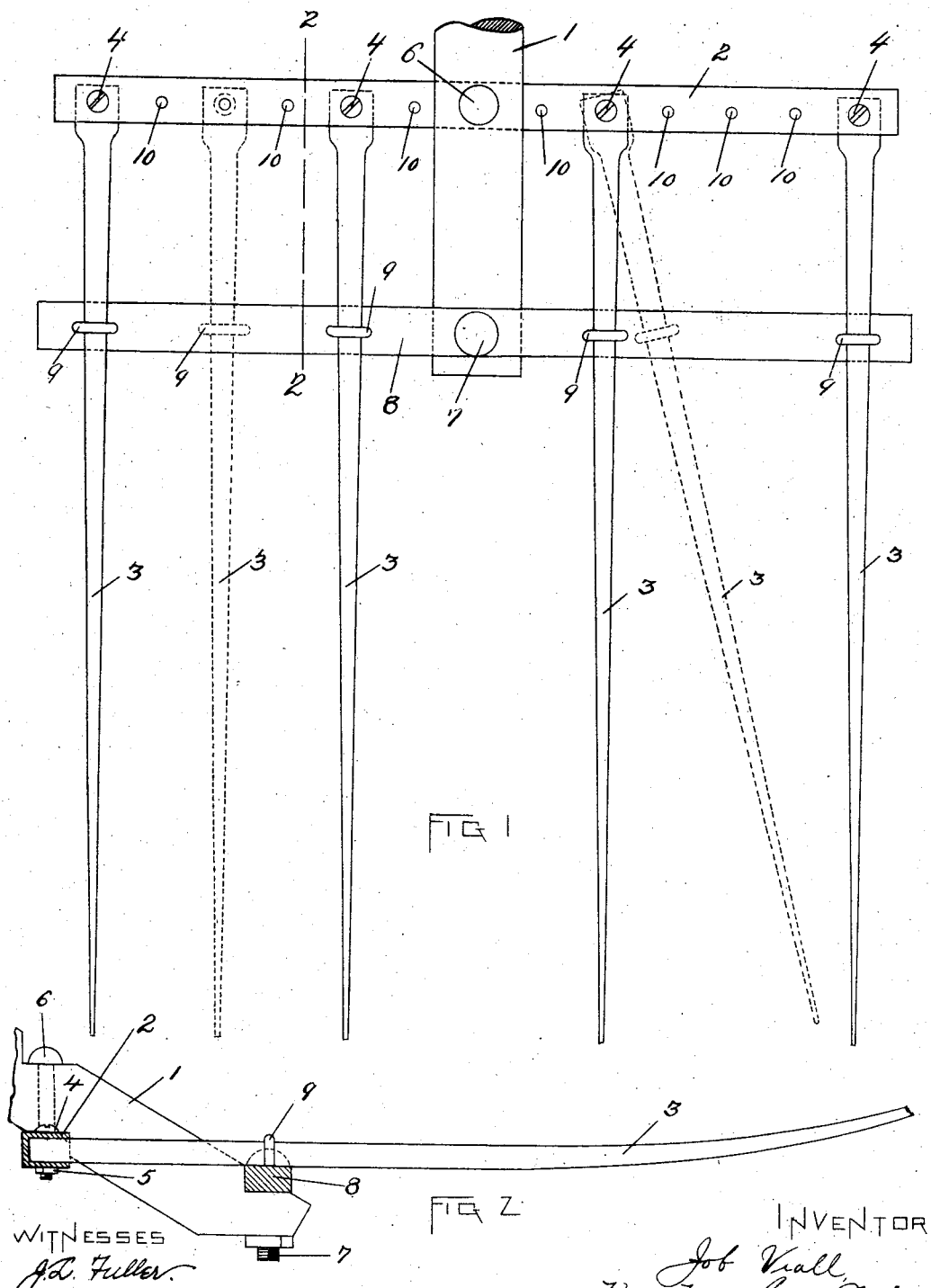

UNITED STATES PATENT OFFICE.

JOB VIALL, OF SCHAGHTICOKE, NEW YORK, ASSIGNOR TO JENNIE E. VIALL, OF SCHAGHTICOKE, NEW YORK.

AGRICULTURAL FORK.

No. 834,951.   Specification of Letters Patent.   Patented Nov. 6, 1906.

Application filed June 14, 1906. Serial No. 321,624.

*To all whom it may concern:*

Be it known that I, JOB VIALL, a citizen of the United States, residing at Schaghticoke, county of Rensselaer, and State of New York, have invented certain new and useful Improvements in Agricultural Forks, of which the following is a specification.

The invention relates to such improvements; and it consists of the novel construction and combination of parts hereinafter described and subsequently claimed.

Reference may be had to the accompanying drawings, and the reference characters marked thereon, which form a part of this specification.

Similar characters refer to similar parts in both figures therein.

Figure 1 of the drawings is a top plan view of my improved fork with the handle broken away and the guard removed. Fig. 2 is a vertical cross-section of the same, taken on the broken line 2 2 in Fig. 1.

My invention relates to agricultural forks, and more particularly to what is known in the art as a "barley-fork," the same, being adapted for handling bundles of grain.

The invention is applicable, however, to various kinds of forks.

The principal object of the invention is to permit of a new tine or prong being substituted for a broken tine or prong.

Other objects will appear in connection with the following description.

Referring to the drawings, wherein the invention is shown in preferred form, 1 represents the handle, and 2 the head, of the fork.

The head is made of channel-iron and is adapted to receive within the channel thereof the butt-ends of the tines or prongs 3, which are secured to the head each by means of a screw-bolt 4, passing through the parallel members of the channel-iron and the interposed butt of the tine, and a nut 5 on said screw-bolt.

To remove a broken tine, it is only necessary to remove the nut and bolt whereby said butt is secured to the head, making it a comparatively simple matter to substitute a new tine for a broken or damaged tine.

The handle, which may be made of wood or any desired material, is notched to receive the channel-iron of the head, to which it is bolted by means of a screw-bolt 6.

The inner end of the handle projects a short distance beyond the head 2 and has secured thereto by a screw-bolt 7 a cross-bar 8, extending beneath the tines, the tines being secured to said cross-bar each by a staple 9, through the loop of which the tine passes.

When the screw-bolts 4 are loosened, the respective tines can be rotated thereupon to change their angular position relatively to each other, such adjustment of a tine being permitted by removing the staple 9, which staple is reinserted to secure the tine in the desired adjusted position. This adjustment makes it possible to quickly adapt the fork for use with either long or short grain or for different uses for which it may be desired to use the fork, it being well understood in the art that for heavy material, such as cotton, it is desirable to have the tines parallel with each other, while in handling grain it is desirable to have the tines diverge considerably, depending more or less upon the length of the grain to be handled.

The head 2 is provided with a series of apertures 10, alined in pairs in its parallel members and each adapted to receive one of the screw-bolts 4, permitting the tines to be located upon the head at various distances apart, as desired.

The tines 3 are preferably made of wrought iron or steel, but may be made of any desired material.

What I claim as new, and desire to secure by Letters Patent, is—

1. A fork comprising a handle; a head secured to the handle comprising a channel-iron open on its front side and provided with a series of apertures alined in pairs in its parallel members; a plurality of tines mounted upon said head with their butts extending through the front opening into the channel therein, and a screw-bolt inserted through an aperture in the butt of each tine, and through an alined pair of apertures in said channel-iron.

2. A fork comprising a handle; a head mounted upon said handle; a cross-bar mounted upon said handle; a plurality of tines pivotally mounted upon said head to swing upon a vertical axis; and means for securing said tines to said cross-bar at a selected angle thereto.

3. A fork comprising a handle; a channeled head mounted upon said handle with its channel open at the front; a cross-bar mounted upon said handle; a plurality of tines superimposed upon said cross-bar with their butts extending through the front opening into said channeled head; detachable screw-bolt connections between the butt of each tine and said channeled head; and a staple connection between said cross-bar and each tine.

In testimony whereof I have hereunto set my hand this 12th day of June, 1906.

JOB VIALL.

Witnesses:
C. L. STROPE,
ARTHUR J. CASE.